US011098812B2

United States Patent
Kubo et al.

(10) Patent No.: US 11,098,812 B2
(45) Date of Patent: Aug. 24, 2021

(54) PRESSURE REDUCING VALVE

(71) Applicant: JTEKT CORPORATION, Osaka (JP)

(72) Inventors: Toshikatsu Kubo, Kariya (JP); Akira Nakano, Okazaki (JP); Yuya Kihara, Nishio (JP); Yutaka Hotta, Toyota (JP); Akira Yamashita, Toyota (JP)

(73) Assignee: JTEKT CORPORATION, Osaka (JP)

( * ) Notice: Subject to any disclaimer, the term of this patent is extended or adjusted under 35 U.S.C. 154(b) by 72 days.

(21) Appl. No.: 16/378,631

(22) Filed: Apr. 9, 2019

(65) Prior Publication Data

US 2019/0316698 A1    Oct. 17, 2019

(30) Foreign Application Priority Data

Apr. 16, 2018   (JP) .............................. JP2018-078262

(51) Int. Cl.

| F16K 31/12 | (2006.01) |
| F16K 17/30 | (2006.01) |
| F15B 13/02 | (2006.01) |
| F16K 39/04 | (2006.01) |
| G05D 16/10 | (2006.01) |

(52) U.S. Cl.
CPC ............ *F16K 17/30* (2013.01); *F15B 13/024* (2013.01); *F16K 39/045* (2013.01); *G05D 16/107* (2019.01); *Y10T 137/7794* (2015.04); *Y10T 137/7826* (2015.04)

(58) Field of Classification Search
CPC ......... Y10T 137/7826; Y10T 137/7823; Y10T 137/7822
See application file for complete search history.

(56) References Cited

U.S. PATENT DOCUMENTS

| 5,086,807 A * | 2/1992 | Lasnier ................ G05D 16/107 137/505.11 |
| 2009/0272443 A1* | 11/2009 | Lee .......................... F17C 13/04 137/505.11 |
| 2011/0114867 A1* | 5/2011 | Suzuki ................. G05D 16/107 251/324 |

(Continued)

FOREIGN PATENT DOCUMENTS

| DE | 102016220704 A1 | 4/2017 |
| JP | 2017-204245 A | 11/2017 |

OTHER PUBLICATIONS

Jun. 25, 2019 extended European Search Report issued in European Patent Application No. 19169322.5.

*Primary Examiner* — Robert K Arundale
(74) *Attorney, Agent, or Firm* — Oliff PLC (57) ABSTRACT

A pressure reducing valve includes: a housing having an input port, an input channel connected to the input port, a pressure reducing chamber connected to the input channel, a delivery channel connected to the pressure reducing chamber, an output channel and an auxiliary channel branched off from the delivery channel, an output port connected to the output channel, and an auxiliary port connected to the auxiliary channel; and a valve mechanism which is provided inside the pressure reducing chamber connected to the delivery channel and of which the amount of opening is changed to regulate the pressure inside the pressure reducing chamber. Centerlines of the delivery channel, the output channel, and the auxiliary channel are arranged in the same plane.

5 Claims, 4 Drawing Sheets

(56) References Cited

U.S. PATENT DOCUMENTS

| | | | |
|---|---|---|---|
| 2014/0158237 A1* | 6/2014 | Haneda | G05D 16/107 137/599.01 |
| 2016/0118676 A1* | 4/2016 | Shima | F16K 1/42 137/599.01 |
| 2016/0138726 A1* | 5/2016 | Saito | F16K 1/32 137/535 |
| 2017/0115673 A1* | 4/2017 | Kobayashi | F16K 31/1221 |
| 2018/0087682 A1* | 3/2018 | Kubo | G05D 16/107 |
| 2018/0100596 A1* | 4/2018 | Lee | H01M 8/04104 |
| 2018/0136672 A1* | 5/2018 | Nakano | G05D 16/107 |
| 2019/0072988 A1* | 3/2019 | Sugiyama | H01M 8/04104 |

* cited by examiner

PRESSURE REDUCING VALVE

INCORPORATION BY REFERENCE

The disclosure of Japanese Patent Application No. 2018-078262 filed on Apr. 16, 2018 including the specification, drawings and abstract is incorporated herein by reference in its entirety.

BACKGROUND

1. Technical Field

The present disclosure relates to a pressure reducing valve.

2. Description of Related Art

Some pressure reducing valves (regulators) that are used to regulate the pressure of a high-pressure hydrogen gas etc. for a fuel cell vehicle have a valve mechanism between an input port (primary port) and an output port (secondary port) (e.g., Japanese Patent Application Publication No. 2017-204245 (JP 2017-204245 A)). In this pressure reducing valve, a piston inside a pressure reducing chamber (secondary chamber) slides based on the pressure of a gas having flowed from the input port into the pressure reducing chamber through the valve mechanism, and the amount of opening of a valve of the valve mechanism is changed by this sliding piston.

The high-pressure gas on the input port side is thus reduced in pressure and delivered to the secondary chamber through the valve mechanism. Then, the gas having been reduced in pressure is delivered from the secondary chamber to the output port through a delivery channel and a secondary channel (output channel), and is thereafter delivered to a fuel cell main body.

The pressure reducing valve of JP 2017-204245 A has an auxiliary channel that is branched off at a connecting part (branching part) between the delivery channel and the secondary channel (output channel) toward an auxiliary port. In JP 2017-204245 A, the auxiliary port is a leakage check port that is used to check for leakage of a hydrogen gas in the valve mechanism, and the auxiliary channel is a leakage check channel. In addition, an auxiliary channel for a relief valve (relief valve channel) is branched off at an intermediate point in the leakage check channel (auxiliary channel).

SUMMARY

The delivery channel, the output channel, and the leakage check channel connected to one another at the connecting part (branching part) extend in X-axis, Y-axis, and Z-axis directions, respectively, and are arranged orthogonal to one another. The centerline of the relief valve channel is arranged orthogonal to the centerline of the leakage check channel. This arrangement is responsible for the large size of the housing of the pressure reducing valve in which these channels are formed, and by extension for the large size of the pressure reducing valve. Moreover, due to the complicated arrangement of the channels, forming these channels by processing requires longer processing man-hours, thereby incurring additional processing costs.

The present disclosure provides a pressure reducing valve in which the arrangement of the delivery channel, the output channel, and the auxiliary channel is simplified for downsizing and the processing man-hours of these channels are reduced for cost reduction.

A pressure reducing valve according to a first aspect of the present disclosure reduces the pressure of a fluid at an input port and then delivers the fluid to an output port, and includes: a housing having the input port, an input channel connected to the input port, a pressure reducing chamber connected to the input channel, a delivery channel connected to the pressure reducing chamber, an output channel and one or more auxiliary channels branched off from the delivery channel, the output port connected to the output channel, and an auxiliary port connected to the auxiliary channel; and a valve mechanism which is provided inside the pressure reducing chamber connected to the delivery channel and of which the amount of opening is changed to regulate the pressure inside the pressure reducing chamber. Centerlines of the delivery channel, the output channel, and the auxiliary channel are arranged in the same plane.

Thus, the centerlines of the delivery channel, the output channel, and the auxiliary channel are arranged in the same plane. This can eliminate the need for a thick wall of the housing that is required when the three channels are arranged orthogonal to one another as in the related art. In the present disclosure, the wall of the housing can be made thinner and the thickness of the housing at least in one of the three directions in which the channels extend orthogonal to one another can be reduced, so that the housing, and by extension the pressure reducing valve, can be downsized. Moreover, since the delivery channel, the output channel, and the auxiliary channel are arranged in the same plane, one can simply turn a table to process these channels. This can reduce the processing man-hours and costs.

A pressure reducing valve according to a second aspect of the present disclosure reduces the pressure of a fluid at an input port and then delivers the fluid to an output port, and includes: a housing having the input port, an input channel connected to the input port, a pressure reducing chamber connected to the input channel, a delivery channel connected to the pressure reducing chamber, an output channel and auxiliary channels branched off from the delivery channel, the output port connected to the output channel, and auxiliary ports connected to the auxiliary channels; and a valve mechanism which is provided inside the pressure reducing chamber connected to the delivery channel and of which the amount of opening is changed to regulate the pressure inside the pressure reducing chamber. The auxiliary channels are a leakage check channel connected to the auxiliary port that is used to check for leakage while the valve mechanism is closed, and a relief valve channel connected to the auxiliary port that is intended for a relief valve. Centerlines of the delivery channel, the leakage check channel, and the relief valve channel are arranged in the same plane. The present disclosure in this aspect can achieve effects similar to those in the above aspect.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. First Embodiment 1-1. Configuration of Pressure Reducing Valve 10

A first embodiment of a pressure reducing valve will be described below in accordance with the drawings. A pressure reducing valve (regulator) 10 shown in FIG. 1 is provided at an intermediate point in a fluid circuit that connects to each other a hydrogen tank and a fuel cell installed in a fuel cell vehicle, and reduces the pressure of a high-pressure hydrogen gas and then delivers the hydrogen gas toward the fuel cell.

Figure 1:
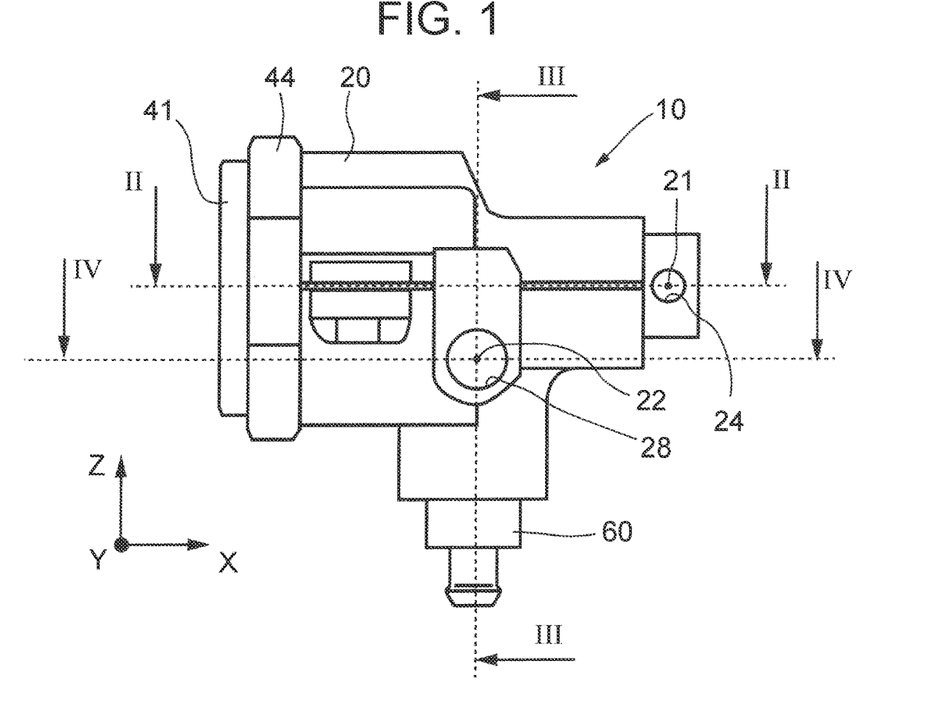
FIG. 1 is an overall sketch of a pressure reducing valve according to a first embodiment.
Figure 2:
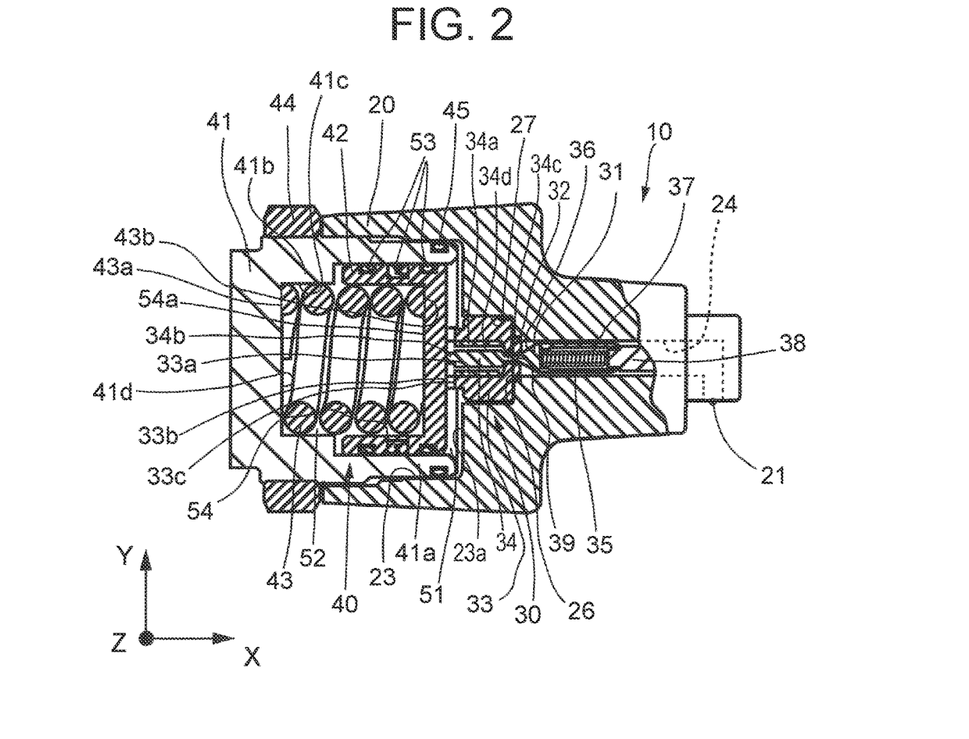
FIG. 2 is a sectional view taken along line I-II of FIG. 1.

As shown in FIG. 1 and FIG. 2, the pressure reducing valve 10 includes: a housing 20 in which an input port 21 and an output port 22 are formed; a valve mechanism 30 provided inside the housing 20 between the input port 21 and the output port 22; a pressing mechanism 40 that regulates the amount of opening (degree of opening) of the valve mechanism 30; and a relief valve 60.

To help understand the drawings, arrows of X-axis, Y-axis, and Z-axis representing directions are shown in the drawings. In this embodiment, for example, the Z-axis direction represents an up-down direction in the direction of gravity, and the X-axis direction and the Y-axis direction represent directions in a horizontal plane. However, this is merely an example and the directions of the X-axis, Y-axis, and Z-axis can be set arbitrarily.

1-1-1. Housing 20

Figure 3:
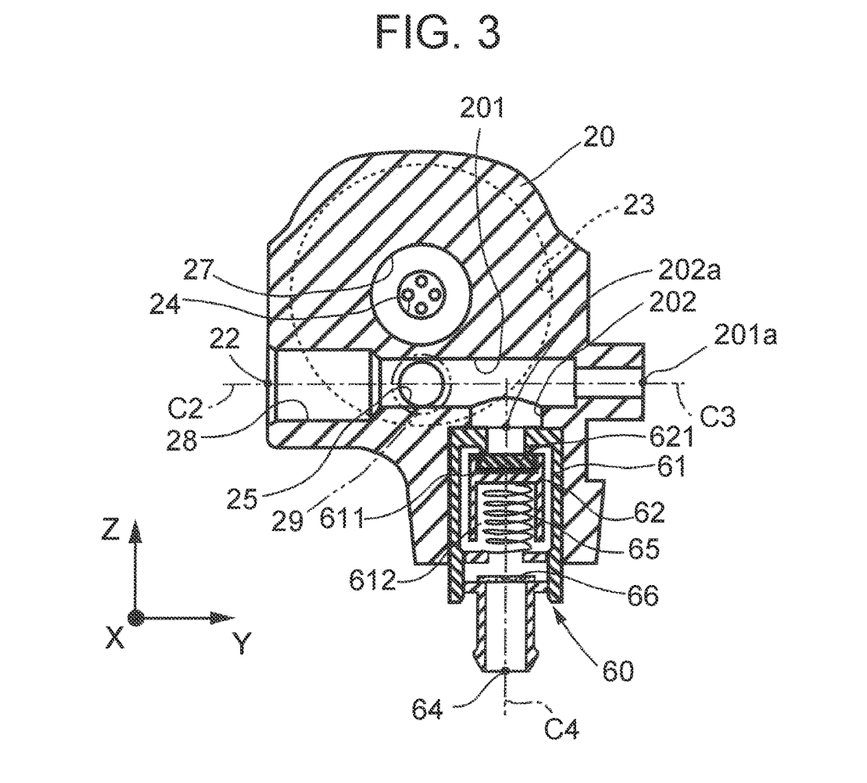
FIG. 3 is a sectional view taken along line III-III of FIG. 1.
Figure 4:
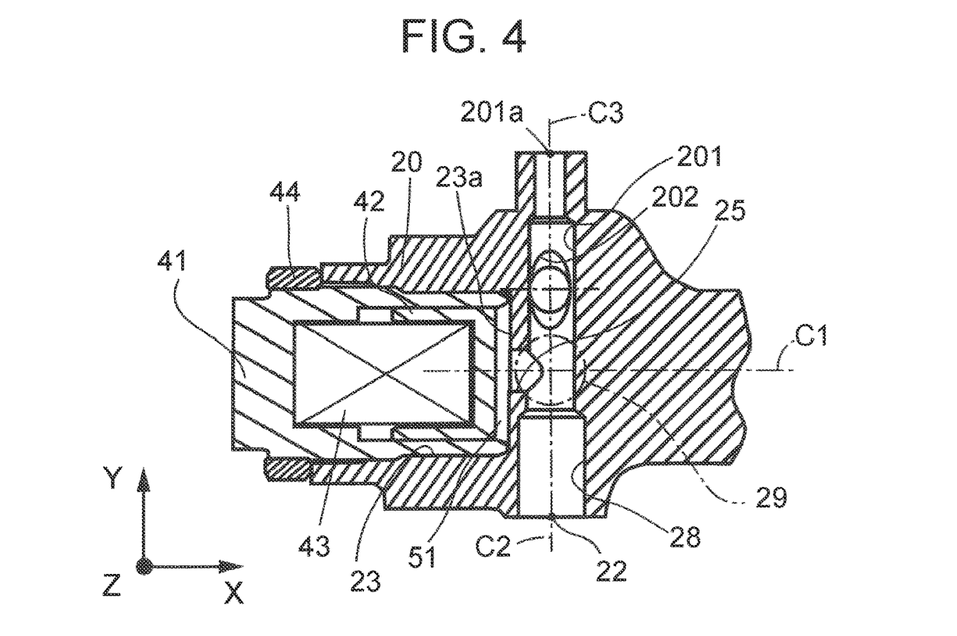
FIG. 4 is a sectional view taken along line IV-IV of FIG. 1.

As shown in FIG. 2, a housing hole 23 having a round hole shape that communicates with the input port 21 and the output port 22 and opens to an outside is formed in the housing 20. An input channel 24 extending from the input port 21 opens at the center of a bottom surface 23a of the housing hole 23. As shown in FIG. 3 and FIG. 4, a delivery channel 25 opens at an off-center position in the bottom surface 23a of the housing hole 23. An output channel 28 is provided between the delivery channel 25 and the output port 22. As shown in FIG. 3 and FIG. 4, the output channel 28 is branched off at a branching part 29 that is provided at an end of the delivery channel 25 on the opposite side from the bottom surface 23a of the housing hole 23.

As shown in FIG. 3 and FIG. 4, the housing 20 further includes a leakage check channel 201 (corresponding to the auxiliary channel) branched off at the branching part 29 and a leakage check port 201a (corresponding to the auxiliary port). The leakage check port 201a is an opening of the leakage check channel 201 that communicates with the outside. The leakage check port 201a is a port to which a connection unit of a gas leakage amount measuring device is connected to check for leakage of the hydrogen gas using this leakage amount measuring device while the valve mechanism 30, to be described in detail later, is closed. In this embodiment, a centerline C3 of the leakage check channel 201 is arranged on the same axis as a centerline C2 of the output channel 28. This will be described in detail later.

As shown in FIG. 3, the housing 20 further includes a relief valve channel 202 branched off at an intermediate point in the leakage check channel 201 and a relief valve port 202a. In this embodiment, a centerline C4 of the relief valve channel 202 is arranged orthogonal to both the centerline C3 of the leakage check channel 201 and the centerline C1 of the delivery channel 25.

As shown in FIG. 2, the inside diameter of an open part of the input channel 24 on the side of the housing hole 23 is set to be larger than that of the other part so as to house the valve mechanism 30. Specifically, the open part of the input channel 24 has, from an upstream side of the input channel 24 (the right side in FIG. 2), a cylindrical first housing portion 26 and a cylindrical second housing portion 27 that is continuous with the first housing portion 26 and opens in the bottom surface 23a. The inside diameter of the second housing portion 27 is larger than that of the first housing portion 26, and these housing portions are formed so as to be arranged on the same axis as the housing hole 23.

The valve mechanism 30 is provided inside a pressure reducing chamber 51 connected to the delivery channel 25, and the amount of opening of the valve mechanism 30 is changed to regulate the pressure inside the pressure reducing chamber 51. The valve mechanism 30 includes a valve body 31 housed inside the input channel 24, a valve seat 32 housed inside the first housing portion 26, a plug 33 housed inside a second housing portion 27, and a valve stem 34 arranged inside the plug 33.

The valve body 31 has a main body 35 having a substantially cylindrical shape closed at one end, and a contact part 36 that has a tapered portion at which the outside diameter decreases gradually from a bottom of the main body 35 toward a downstream side (the left side in FIG. 2), and that has a substantially constant outside diameter at a leading end. The outside diameter of the valve body 31 (main body 35) is set to be slightly smaller than the inside diameter of the input channel 24, so that the valve body 31 can slide inside the input channel 24 in an axial direction. An urging member 37, such as a coil spring, is housed inside the main body 35. The valve body 31 is urged toward the downstream side as the urging member 37 is compressed between the valve body 31 and a rod-shaped support member 38 that is arranged on the upstream side of the input channel 24.

The valve seat 32 has a valve hole 39, is formed in an annular shape, and is press-fitted inside the first housing portion 26. The inside diameter of the valve hole 39 is substantially equal to the outside diameter of the contact part 36 at an intermediate position in the tapered portion thereof. The valve seat 32 is made of an elastically deformable hard resin, such as a polyimide resin.

The plug 33 has a columnar shape, and is screwed in on an inner circumference of the second housing portion 27 while compressing the valve seat 32, with a part of the plug 33 protruding into the housing hole 23. A through-hole 33a extending through the plug 33 in an axial direction is formed at the center of the plug 33, on the same axis as the valve hole 39. An upstream-side part of the through-hole 33a has a smaller diameter than the other part, and the inside diameter of this upstream-side part is set to be substantially equal to the inside diameter of the valve hole 39. A channel hole 33c which extends in a radial direction and by which the through-hole 33a and the housing hole 23 communicate with each other is formed in a protruding portion 33b of the plug 33 protruding into the housing hole 23.

The valve stem 34 has a columnar part 34a having an elongated columnar shape, a downstream end part 34b protruding from the columnar part 34a toward the downstream side, and an upstream end part 34c protruding from the columnar part 34a toward the upstream side. The outside diameter of the columnar part 34a is set to be slightly smaller than the inside diameter of the through-hole 33a, so that the columnar part 34a can slide inside the through-hole 33a in the axial direction.

The columnar part 34a has a plurality of channel holes 34d that extends in the axial direction and is formed at equal angular intervals around a central axis of the columnar part 34a. The downstream end part 34b is formed in a columnar shape having a smaller outside diameter than the columnar part 34a. The outside diameter of the upstream end part 34c is set to be substantially equal to the outside diameter of the leading end portion of the contact part 36 of the valve body 31, and the upstream end part 34c and the contact part 36 are inserted through the valve hole 39 and the through-hole 33a and in contact with each other.

The pressing mechanism 40 includes a cylinder 41 fixed to the housing hole 23, a piston 42 slidably housed inside the cylinder 41, and a coil spring 43 arranged in a compressed state between the cylinder 41 and the piston 42.

The cylinder 41 has a cylindrical shape closed at one end. The cylinder 41 is fixed to the housing 20 as an outer circumferential part of a cylindrical part 41a is screwed in on the inner circumference of the housing hole 23 and a locknut 44 is screwed in on an outer circumferential part of a bottom part 41b. A sealing member 45, such as an O-ring, is mounted on an outer circumference of an opening of the cylindrical part 41a to secure airtightness between the housing hole 23 and the outside. A spring installation hole 41c is formed by an inner circumferential surface of the cylinder 41.

The piston 42 has a cylindrical shape closed at one end, and the outside diameter of the piston 42 is set to be substantially equal to the inside diameter of the cylindrical part 41a of the cylinder 41. The piston 42 is housed inside the cylindrical part 41a so as to be slidable in the axial direction, and divides the inside of the cylindrical part 41a into the pressure reducing chamber 51 (secondary chamber) and a pressure regulating chamber 52. Ring members 53, such as a wear ring and a lip seal, are mounted on an outer circumference of the piston 42 to secure airtightness between the pressure reducing chamber 51 and the pressure regulating chamber 52. The pressure regulating chamber 52 is open to the atmosphere.

A spring installation hole 54 is formed by an inner circumferential surface of the piston 42. The piston 42 is in contact with the downstream end part 34b of the valve stem 34. Thus, the valve stem 34 and the valve body 31 move integrally as the piston 42 slides.

The coil spring 43 is housed in a compressed state inside the spring installation holes 41c, 54 of the cylinder 41 and the piston 42. Specifically, the coil spring 43 is arranged while being compressed, with one end surface 43a of the coil spring 43 being in contact with a seat surface 41d that is a bottom surface of the spring installation hole 41c and the other end surface 43b being in contact with a seat surface 54a that is a bottom surface of the spring installation hole 54. The coil spring 43 urges the piston 42 such that the valve body 31 is separated from the valve seat 32, i.e., the amount of opening (degree of opening) of the valve mechanism 30 increases.

In the pressure reducing valve 10 thus configured, the piston 42 slides inside the cylindrical part 41a according to the differential pressure between the pressure reducing chamber 51 and the pressure regulating chamber 52 and the urging force of the urging member 37 and the coil spring 43. The amount of opening of the valve mechanism 30 is regulated according to the axial position of the piston 42 such that the pressure at the output port 22 (the pressure inside the pressure reducing chamber 51) does not exceed a predetermined pressure.

However, when the pressure at the output port 22, i.e., the pressure at the relief valve port 202a connected to the output port 22 exceeds the predetermined pressure, the relief valve 60 is opened to release the pressure at the output port 22 (the relief valve port 202a).

As shown in FIG. 3, the relief valve 60 includes a housing 61, a piston 62, a discharge port 64, a spring 65, and a gas-permeable film 66. The gas-permeable film 66 keeps foreign objects from entering from the side of the discharge port 64 into a hollow part 612 of the housing 61. When the pressure at the relief valve port 202a exceeds the predetermined pressure, a valve body 621 of the piston 62 is urged by the exceeding pressure in a valve opening direction. Then, the piston 62 moves in the valve opening direction and the valve body 621 is separated from a valve seat 611.

Thus, the hydrogen gas is discharged from the discharge port 64 to the outside through a gap between the valve seat 611 and the valve body 621 and through the inside of the housing 61. Accordingly, the pressure on the side of the relief valve port 202a decreases, so that each part of the pressure reducing valve 10 and the fuel cell main body are appropriately protected. Thus, the relief valve 60 is a common relief valve having a publicly known relief function. Therefore, the description of further details of the relief valve 60 will be omitted.

1-1-2. Detailed Description of Channels

Next, the channels according to the present disclosure will be described in detail based on FIG. 2 to FIG. 5. As described above, the housing 20 includes, as hydrogen gas channels, the input port 21 and the input channel 24 connected to the input port 21 as shown in FIG. 2 to FIG. 4. The housing 20 further includes, as hydrogen gas channels, the pressure reducing chamber 51 connected to the input channel 24, the delivery channel 25 connected to the pressure reducing chamber 51, and the output channel 28 and the leakage check channel 201 (corresponding to the auxiliary channel) branched off from the delivery channel 25 at the branching part 29. The housing 20 further includes the output port 22 that is an opening of the output channel 28, and the leakage check port 201a (corresponding to the auxiliary port) that is an opening of the leakage check channel 201.

As described above, the housing 20 further includes the relief valve channel 202 branched off at an intermediate point in the leakage check channel 201 and the relief valve port 202a as shown in FIG. 3. In this embodiment, the relief valve channel 202 is arranged with the centerline C4 orthogonal to both the centerline C3 of the leakage check channel 201 and the centerline C1 of the delivery channel 25. These channels are depicted in a schematic view as shown in FIG. 5.

Figure 5:
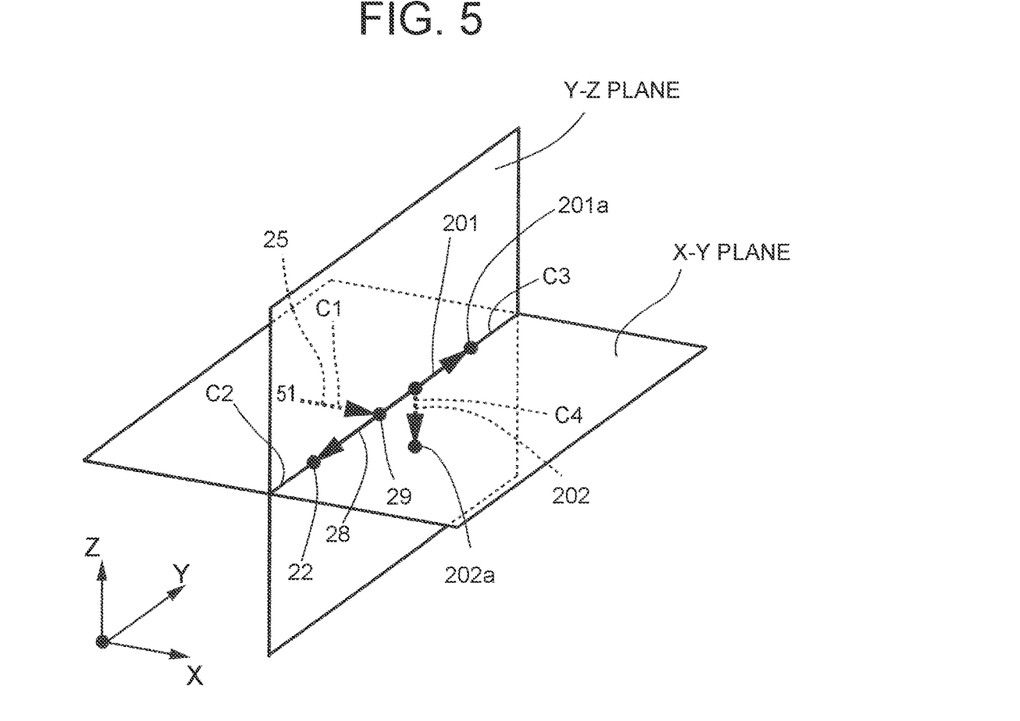
FIG. 5 is a schematic view illustrating the arrangement of channels in the first embodiment.

As shown in FIG. 5, in the first embodiment, the centerlines C1, C2, C3 of the delivery channel 25, the output channel 28, and the leakage check channel 201 (auxiliary channel) are arranged in the same X-Y plane, and the centerlines C2, C3 of the output channel 28 and the leakage check channel 201 are formed by the same axis. For example, the X-Y plane is a horizontal plane as described above. The centerline C4 of the relief valve channel 202 is arranged in the Y-Z plane orthogonal to the X-Y plane. In this case, for example, the Y-Z plane is a plane perpendicular in the direction of gravity (vertical plane).

Having the channels 25, 28, 201, 202 arranged as described above, the housing 20 partially requires some wall thickness to form the relief valve channel 202 in the Z-axis direction, but does not require a large wall thickness in the other part than the relief valve channel 202. In other words, if the housing 20 has a thin wall in the Z-axis direction, the delivery channel 25, the output channel 28 (output port 22), and the leakage check channel 201 (leakage check port 201a) can be formed.

Therefore, the size and weight of the housing 20 can be reduced. Moreover, the output channel 28 and the leakage check channel 201 are arranged on the same axis. This allows the output channel 28 and the leakage check channel 201 to be processed at the same time. Since the output channel 28 and the leakage check channel 201 are formed by through-holes, chips can be easily discharged. Furthermore, the branching part 29 at which these channels are branched off from the delivery channel 25 can be visually checked from the output port 22 and the leakage check port 201a, so that burrs, if any, can be easily removed.

1-2. Effects of First Embodiment

According to the above-described first embodiment, the pressure reducing valve 10 includes: the housing 20 in which the input port 21, the input channel 24 connected to the input port 21, the pressure reducing chamber 51 connected to the input channel 24, the delivery channel 25 connected to the pressure reducing chamber 51, the output channel 28 and the auxiliary channel (leakage check channel 201) branched off from the delivery channel 25, the output port 22 connected to the output channel 28, and the auxiliary port (201a) connected to the auxiliary channel (leakage check channel 201), are formed; and the valve mechanism 30 which is provided inside the pressure reducing chamber 51 connected to the delivery channel 25 and of which the amount of opening is changed to regulate the pressure inside the pressure reducing chamber 51. The centerlines (C1, C2, C3) of the delivery channel 25, the output channel 28, and the auxiliary channel (leakage check channel 201) are arranged in the same plane.

Thus, the amount of wall of the housing required when the three channels are arranged orthogonal to one another as in the related art can be significantly reduced. Accordingly, the thickness of the housing 20 in one of the orthogonal three directions can be reduced, and thereby the housing 20, and by extension the pressure reducing valve 10, can be downsized. Since the delivery channel 25, the output channel 28, and the auxiliary channel (leakage check channel 201) are arranged in the same plane, one can simply turn a table of a processing machine to process these channels (25, 28, 201). This can reduce the processing man-hours and costs.

According to the first embodiment, the centerlines C2, C3 of the output channel 28 and the auxiliary channel (leakage check channel 201) are formed by the same axis. Thus, one through-hole is formed by the output channel 28 and the auxiliary channel (leakage check channel 201), which makes it easy to process these channels. Moreover, chips can be easily discharged. Furthermore, the branching part 29 at which these channels are branched off from the delivery channel 25 is easy to visually check from the output port 22 and the leakage check port 201a.

According to the first embodiment, the auxiliary channel is the leakage check channel 201 connected to the auxiliary port 201a that is used to check for leakage while the valve mechanism 30 is closed. Thus, effects similar to those of the above embodiment can be achieved.

1-3. Modified Example 1

Next, Modified Example 1 of the first embodiment will be described. In the pressure reducing valve 10 of the first embodiment, the three channels, the delivery channel 25, the output channel 28, and the leakage check channel 201 (auxiliary channel), are arranged in the same plane (X-Y plane), and the output channel 28 and the leakage check channel 201 are arranged on the same axis. However, the present invention is not limited to this aspect. As Modified Example 1 (not shown), the three channels, the delivery channel 25, the output channel 28, and the leakage check channel 201 (auxiliary channel), may be arranged in the same plane (X-Y plane), without the output channel 28 and the leakage check channel 201 being arranged on the same axis. This example can sufficiently achieve the effects other than the above-described effect of arranging these channels on the same axis.

1-4. Modified Example 2

As Modified Example 2 of the first embodiment (see FIG. 6), the "auxiliary channel" may be the relief valve channel 202 instead of the leakage check channel 201. In this case, it is preferable that the discharge port 64 of the relief valve 60 be arranged so as to discharge the hydrogen gas downward in the direction of gravity. Accordingly, the Z-axis direction and the Y-axis direction are interchanged compared with those in the first embodiment.

Figure 6:
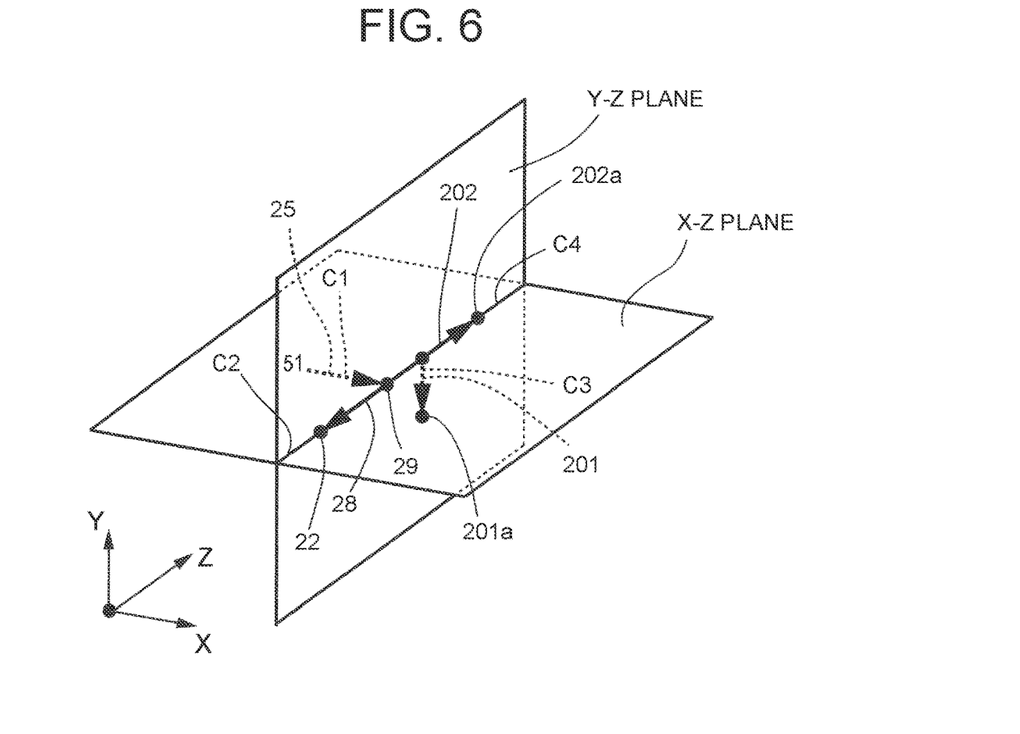
FIG. 6 is a schematic view illustrating the arrangement of the channels in a pressure reducing valve of Modified Example 2.

Thus, the housing 20 of Modified Example 2 partially requires some wall thickness to form the leakage check channel 201 in the Y-axis direction, but does not require a large wall thickness in the other part than the leakage check channel 201. In other words, if the housing 20 has a thin wall in the Y-axis direction, the delivery channel 25, the output channel 28 (output port 22), and the relief valve channel 202 (relief valve port 202a) can be formed. This example is expected to have effects similar to those of the first embodiment.

1-5. Modified Example 3

Figure 7:
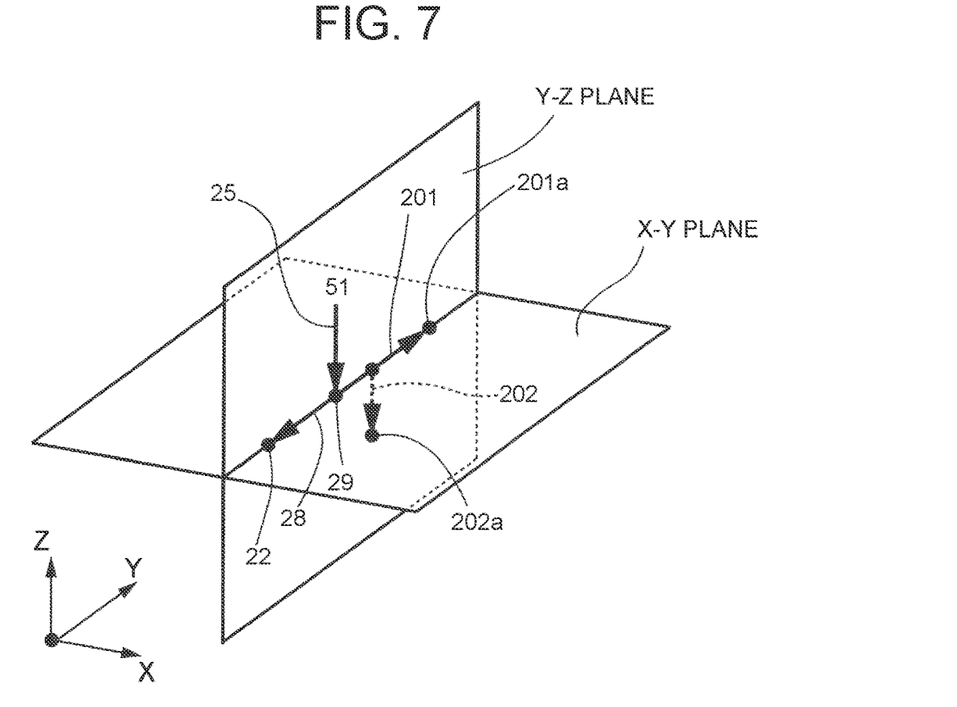
FIG. 7 is a schematic view illustrating the arrangement of the channels in a pressure reducing valve of Modified Example 3.

As Modified Example 3 of the first embodiment, the leakage check channel 201 may be a "first auxiliary channel" and the relief valve channel 202 may be a "second auxiliary channel." Specifically, as shown in the schematic view of FIG. 7, the four channels, the delivery channel 25, the output channel 28, the leakage check channel 201 (first auxiliary channel), and the relief valve channel 202 (second auxiliary channel), may be arranged in the same plane (the Y-Z plane in FIG. 7). This example is most effective in reducing the size and weight of the pressure reducing valve 10.

2. Second Embodiment

Next, a second embodiment will be described. As shown in the schematic view of FIG. 8, the auxiliary channels of a pressure reducing valve of the second embodiment may be a leakage check channel 301 connected to an auxiliary port 301*a* that is used to check for leakage while the valve mechanism 30 is closed, and a relief valve channel 302 connected to an auxiliary port 302*a* that is intended for a relief valve.

Figure 8:
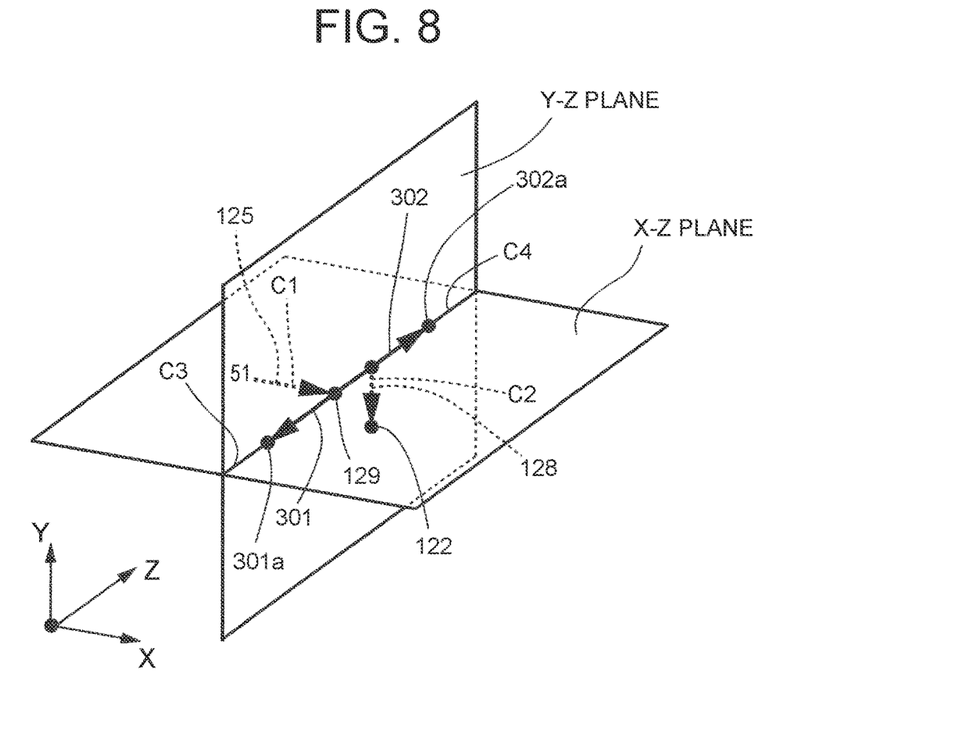
FIG. 8 is a schematic view illustrating the arrangement of channels in a pressure reducing valve of a second embodiment.

In this case, for example, an output channel 128 extending to an output port 122 is arranged orthogonal to a delivery channel 125 connected to a branching part 129, as well as to both the leakage check channel 301 and the relief valve channel 302 branched off at the branching part 129. Thus, the centerlines C1, C3, C4 of the delivery channel 125, the leakage check channel 301, and the relief valve channel 302 are arranged in the same plane (X-Z plane). This arrangement allows for downsizing of the pressure reducing valve as in the first embodiment.

In the second embodiment, the centerlines C3, C4 of the leakage check channel 301 and the relief valve channel 302 are arranged on the same axis. Thus, an effect similar to that of arranging the channels on the same axis in the first embodiment can be achieved.

What is claimed is:

1. A pressure reducing valve that reduces a pressure of a fluid at an input port and then delivers the fluid to an output port, the pressure reducing valve comprising:
    a housing including the input port, an input channel connected to the input port, a pressure reducing chamber connected to the input channel, a delivery channel connected to the pressure reducing chamber, an output channel and auxiliary channels including a first auxiliary channel and a second auxiliary channel branched off from the delivery channel, the output port connected to the output channel, and auxiliary ports connected to the auxiliary channels; and
    a valve mechanism inside the pressure reducing chamber and connected to the delivery channel, wherein
    changing an amount of opening of the valve mechanism regulates a pressure inside the pressure reducing chamber,
    centerlines of the delivery channel, the output channel, and the first auxiliary channel are in a first plane, and
    centerlines of the output channel, the first auxiliary channel and the second auxiliary channel are in a second plane orthogonal to the first plane.

2. The pressure reducing valve according to claim 1, wherein the centerlines of the output channel and the first auxiliary channel are on a same axis.

3. The pressure reducing valve according to claim 1, wherein the first auxiliary channel is a leakage check channel connected to the auxiliary port that is used to check for leakage while the valve mechanism is closed.

4. The pressure reducing valve according to claim 1, wherein the second auxiliary channel is a relief valve channel connected to the auxiliary port.

5. The pressure reducing valve according to claim 1, wherein the auxiliary channels are a leakage check channel connected to the auxiliary port that is used to check for leakage while the valve mechanism is closed, and a relief valve channel connected to the auxiliary port.

* * * * *